United States Patent
Harrington

(10) Patent No.: US 6,862,110 B2
(45) Date of Patent: Mar. 1, 2005

(54) METHOD AND APPARATUS FOR CONTROLLING PAGE COST IN AN IMAGE-RENDERING DEVICE

(75) Inventor: Steven J. Harrington, Webster, NY (US)

(73) Assignee: Xerox Corporation, Stamford, CT (US)

(*) Notice: Subject to any disclaimer, the term of this patent is extended or adjusted under 35 U.S.C. 154(b) by 778 days.

(21) Appl. No.: 09/739,140

(22) Filed: Dec. 18, 2000

(65) Prior Publication Data

US 2002/0075493 A1 Jun. 20, 2002

(51) Int. Cl.[7] ............................ G06F 3/12; G06F 15/00; G06K 15/02
(52) U.S. Cl. ............................ 358/1.9; 705/400; 705/1; 705/30; 700/90; 700/95; 700/106; 700/17
(58) Field of Search .......................... 358/1.9; 345/589, 345/590; 705/400, 1, 30; 101/483; 700/90, 95, 106, 107

(56) References Cited

U.S. PATENT DOCUMENTS

| | | | |
|---|---|---|---|
| 4,513,314 A * | 4/1985 | St. John et al. ............. 358/504 |
| 5,383,129 A * | 1/1995 | Farrell ......................... 705/400 |
| 5,519,815 A | 5/1996 | Klassen | |
| 5,581,376 A | 12/1996 | Harrington | |
| 5,604,578 A * | 2/1997 | Shibuya et al. ............. 399/178 |
| 5,613,784 A * | 3/1997 | Ohashi ......................... 400/76 |
| 5,635,967 A | 6/1997 | Klassen | |
| 5,636,032 A * | 6/1997 | Springett ..................... 358/296 |
| 5,825,986 A * | 10/1998 | Ferguson ..................... 358/1.9 |
| 6,081,340 A | 6/2000 | Klassen | |
| 6,356,359 B1 * | 3/2002 | Motamed ..................... 358/1.8 |
| 6,507,409 B2 * | 1/2003 | Kawaguchi ................ 358/1.16 |

* cited by examiner

Primary Examiner—Edward Coles
Assistant Examiner—David Jones
(74) Attorney, Agent, or Firm—Fay, Sharpe, Fagan, Minnich & McKee, LLP

(57) ABSTRACT

This invention relates to a method and apparatus for controlling page cost in an image rendering device. More particularly, the invention relates to a system and technique that facilitates the limitations of page costs of color documents by establishing a threshold cost limitation and controlling the colorant amounts to be used on the page to ensure that the cost limitation is met.

20 Claims, 8 Drawing Sheets

METHOD AND APPARATUS FOR CONTROLLING PAGE COST IN AN IMAGE-RENDERING DEVICE

BACKGROUND OF THE INVENTION

This invention relates to a method and apparatus for controlling page cost in an image-rendering device. More particularly, the invention relates to a system and technique that facilitates the limitation of page costs of color documents by establishing a threshold cost limitation and controlling the colorant amounts to be used on the page to ensure that the cost limitation is met.

While the invention is particularly directed to the art of controlling cost for rendering color images on pages, and will be thus described with specific reference thereto, it will be appreciated that the invention may have usefulness in other fields and applications. For example, the invention may be used in any image-rendering situation where the costs of different types of ink or other rendering materials that are used vary.

By way of background, it is typical that the cost of printing a page having color images thereon is more expensive than printing the same page in black and white. While the causes of this discrepancy may vary from system to system, the primary contributor to the increased cost of a color page is the higher cost of color materials (e.g. various color inks) as compared to materials used (e.g. black ink) to print in black and white. The practical impact of the higher cost of printing color pages is that less color pages are printed. This, of course, has the disadvantage that many rendered images are not properly printed in color, as may have been intended. Still further, generating color images may be avoided altogether in document preparation to avoid higher costs in printing or copying the document(s).

As such, it would be advantageous to have a system that could print pages that fall within threshold cost constraints but still allows the printing of color pages to occur such that at least some amount of color is rendered on the page.

The present invention contemplates a new method and apparatus for controlling page cost in an image-rendering device that resolves the above-referenced difficulties and others.

SUMMARY OF THE INVENTION

A method and apparatus for controlling page cost in an image-rendering device are provided. The system provides a warranted page cost mode that sets a limit on the cost of printing (e.g. on a per page basis). When operating in this mode, a printer, copier, or other image-rendering device ensures that the desired threshold cost for the printing of the pages is not exceeded.

In one aspect of the invention, a method for controlling cost in an image rendering device—wherein images rendered are represented in the device by color elements having color element specifications, the color elements each have associated therewith cost factors for printing dependent on particular associated colorants and amounts thereof and a threshold printing cost is set—comprises steps of providing a color image having color element specifications, determining colorant amounts of the color image, calculating an actual printing cost for the image based on the colorant amounts and the colorant dependant cost factors, determining whether the actual printing cost exceeds the threshold printing cost, reducing colorant amounts to be used in printing if the actual printing cost exceeds the threshold printing cost and printing one of a modified color image based on the reducing and the color image.

In another aspect of the invention, an image rendering device—wherein images rendered are represented in the device by color element specifications, the color element specifications each have associated therewith colorant-dependent cost factors for printing and a threshold printing cost is set—comprises an input operative to receive a color image having color element specifications, a counting module operative to determine colorant amounts of the color image, a cost determination module operative to calculate an actual printing cost for the image based on the colorant amounts and the colorant-dependent cost factors, a threshold switch operative to determine whether and to what extent the actual printing cost exceeds the threshold printing cost, an ideal color table containing ideal color information accessed through the threshold switch when the actual printing cost does not exceed the threshold, at least one alternative color table containing modified color information accessed through the threshold switch when the actual printing cost exceeds the threshold printing cost and a print engine operative to print one of a modified color image based on the modified color information of the alternative color table and the color image based on the ideal color information of the ideal color table.

In another aspect of the invention, a system includes means for providing a color image having color pixels, a means for determining a number of the color pixels of the color image, a means for calculating an actual printing cost for the image based on the number of color pixels and a pixel cost, a means for determining whether the actual printing cost exceeds a threshold printing cost, a means for reducing the colorant amounts to be used in printing if the actual printing cost exceeds the threshold, and a means for printing either a modified color image based on the reducing or the color image.

In another aspect of the invention, the invention is implemented in a xerographic printing environment.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
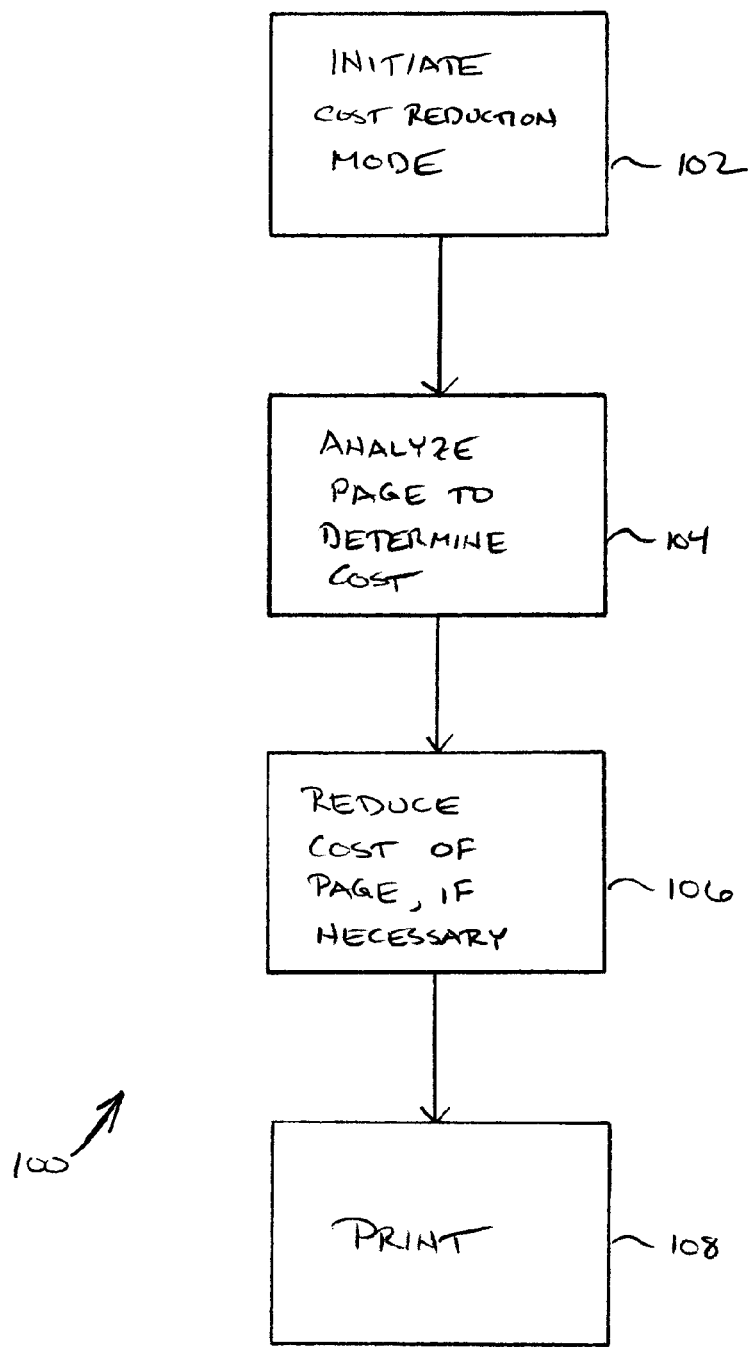
FIG. 1 is a flow chart illustrating an overall method according to the present invention.

Referring now to the drawings wherein the showings are for purposes of illustrating the preferred embodiments of the invention only and not for purposes of limiting same, FIG. 1 provides a view of an overall preferred method according to the present invention that may be implemented in a suitable image rendering device such as a copier or printer. As shown, the overall method 100 includes initiating a cost reduction, or cost saving, mode for the rendering device (step 102) and then analyzing a page to determine a cost for printing thereof (step 104). If necessary, the cost of the page is reduced for printing purposes (step 106). The page is then printed (step 108).

It should be appreciated that, although the overall preferred method is described in connection with determination of cost per page, the invention could also be applied on a document-by-document basis. This alternative could be implemented in situations where entire documents are available for analysis prior to printing. In such a situation, a heavily colored page might print as requested provided that the document contains enough other low cost pages to compensate for the cost of the heavily colored page.

It should be further appreciated that the invention is not limited to the printing of color pages with ink. The techniques described herein could also be applied where printing is accomplished with other image rendering materials (e.g. texture building materials) that vary in cost.

Figure 2:
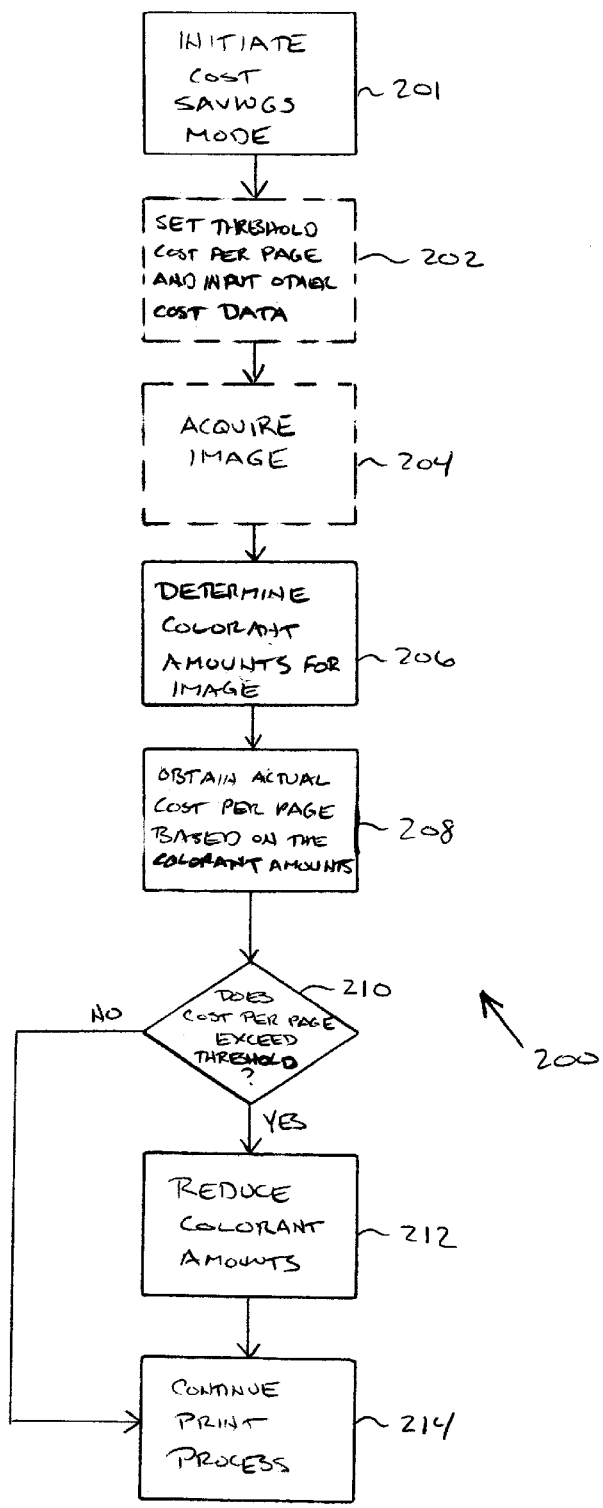
FIG. 2 is a flow chart illustrating a more detailed method according to the present invention.

Referring back now to the drawings, in a preferred embodiment of the invention shown in FIG. 2, a method 200 is implemented by first initiating a cost saving mode for the image rendering device (step 201). Of course, at least in the initial run or prior thereto, the administrator of the rendering device sets a threshold cost per page (step 202), the surpassing of which will cause the features of the present invention to be implemented to save costs. For practical purposes, the initiation of the cost saving mode may also be a decision made only by the administrator of the rendering device as opposed to all users. Such a feature could readily be implemented in conjunction with a required use of security passwords and the like.

In addition, other cost data such as the cost of consumable materials for printing or rendering as well as other costs factors such as energy use, machine wear and the like is input to the system. In one embodiment this is expressed as a cost per color element, or pixel, and is a function of its color (e.g. the colorant amount assigned to the pixel.) In another embodiment this is expressed as a cost per colored area size and is a function of the color. This cost could be determined and set when the device is configured. Alternatively, the cost could be determined and input to the system by the administrator, similar to the manner in which the administrator would input the threshold cost per page. This alternative would, of course, provide improved flexibility in the event that printing materials (or the cost thereof) deviate from the time of initial configuration of the device. The cost per pixel could thus be periodically updated. Again, for practical purposes, in a system where the cost per pixel may be changed, such a change is preferably only made by the administrator of the system, as opposed to all users.

As further shown, the method includes acquiring an image (step 204) and determining the colorant amounts used (for example, by counting the pixels for which colorant amounts are assigned) in that image (step 206). The step of scanning is used to acquire the image in copy devices. However, in printers, scanning is not necessary. The image to be printed may be acquired over a network or from a workstation, and simply requires sufficient analysis to determine the colorant amounts. Typically, an acquired image is comprised of a plurality of color elements (e.g. color pixels) for which color element specifications, such as pixel colors, are designated. However, the acquired image may alternatively be described by a collection of drawing primitives for which the color specification and area to be colored can be determined.

Once the colorant amounts in an image are obtained, the colorant amounts are multiplied by the colorant dependent cost factors and totaled over all color element specifications to obtain an actual, or predicted or calculated, cost per page (step 208). In the embodiment where the cost data is a cost per pixel, the number of pixels in the image for which color (or colorant) amounts are assigned is simply multiplied by the cost per pixel. It should be apparent that the invention is preferably implemented in a digital environment where pixel based analyses is common. However, the present invention is not so limited. The invention may be applied in any environment, digital or otherwise, where the colorant amount for a page can be determined and a cost per page can be calculated prior to the actual printing of the page.

A determination is then made whether the cost per page exceeds the threshold set in step 202 (step 210). If not, the print process is simply continued to print the color image (step 214). If the cost per page that is calculated in step 208 exceeds the threshold, then colorant amounts to be ultimately used in printing are reduced (step 212). Once the colorant amounts are reduced, the print process is simply continued, as those skilled in the art will appreciate (step 214).

It should be understood that step 214 for reducing colorant amounts may be realized in a number of different manners. For example, referring now to FIG. 3, a method 300 for reducing colorant amounts in the system according to the present invention is illustrated. As shown, the step of reducing colorant amounts is initiated (step 302) and then an alternative color table is selected (step 304). The color table is used to map the requested colors (or colorant amounts) to new colorant values. Such color table techniques are well-known components of color management systems.

Such an alternative color table preferably includes colors for which saturation levels are adjusted (e.g. reduced) as compared to the ideal color table of the system that is used in typical color printing applications. Alternatively, the alternative color table could shift the hue of colors from secondary to primary colors that require only one colorant (not two) to produce a rendering. As will be appreciated, colors in such an ideal color table are specified for an image as Page Description Language (PDL) values, scanner values, or streaming data values. Reducing the saturation levels of these colors in the alternative color table will result in less color ink being required for printing. As such, printing costs are reduced.

Figure 3:
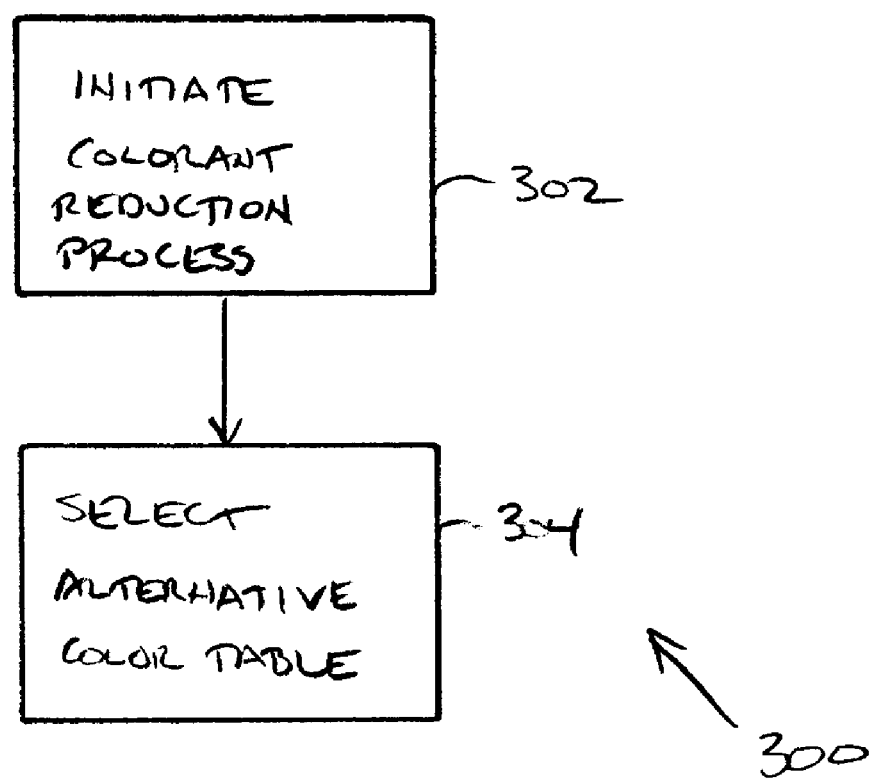
FIG. 3 is a flow chart illustrating a method to reduce colorant amounts.
Figure 4:
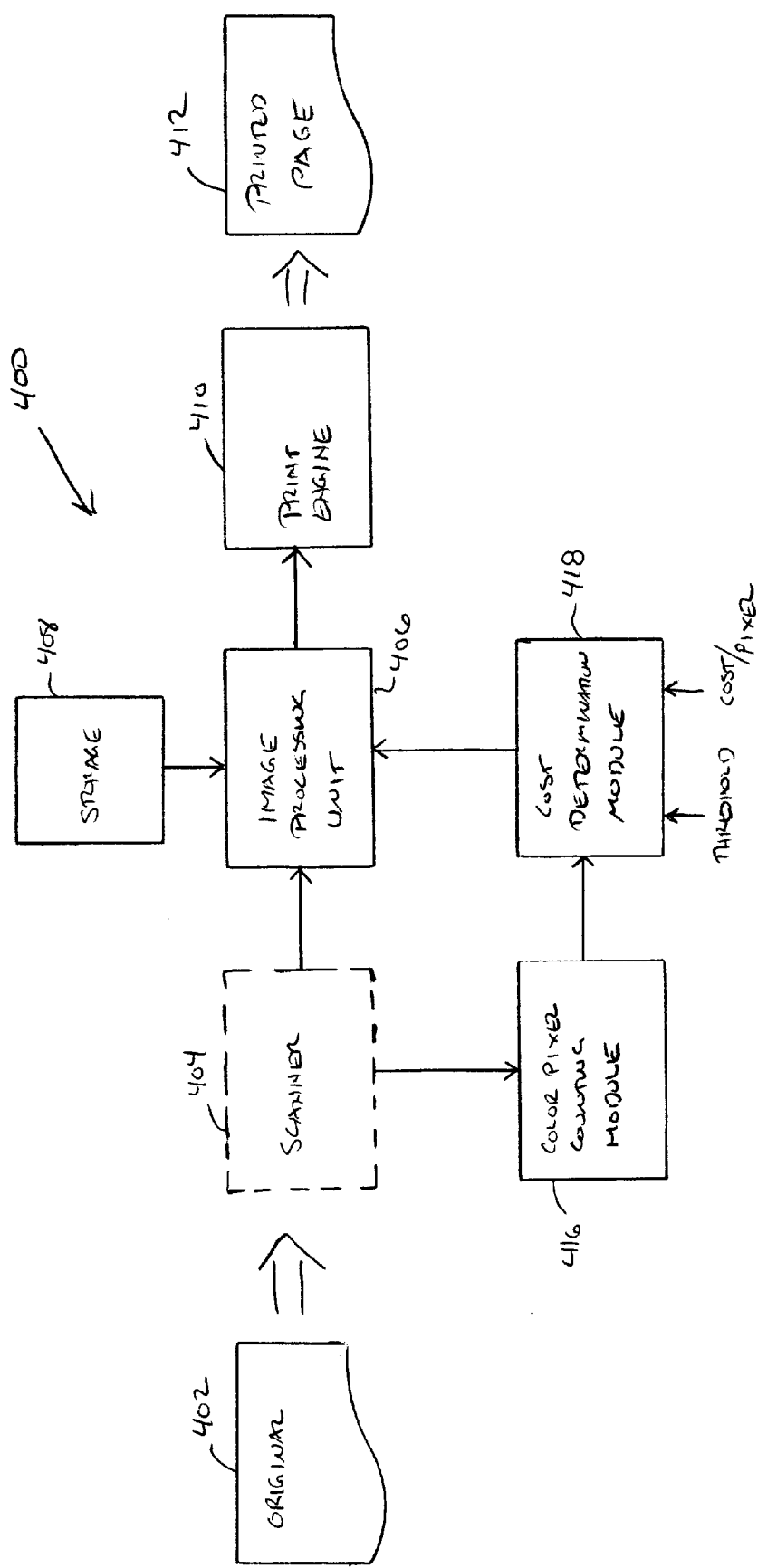
FIG. 4 is a block diagram of an apparatus according to the present invention.

Referring now to FIG. 4, a system for implementing a copier embodiment the method of FIGS. 1–3 is illustrated.

As shown, the system 400 includes a scanner 404 which receives an original image 402. The scanner inputs rasterized data to an image processing unit 406 which is also in communication with a storage device 408. In cases where a scanner is not used, a digital image is simply provided to the image processing unit and a module 416 using known techniques in digital printing. The image processing unit 406 has an output connected to a print engine 410 which ultimately outputs a printed page 412. Preferably, the print engine 410 is a xerographic print engine that operates in a xerographic printing environment. The printing environment is preferably a digital printing environment but may also be of other types. Moreover, xerographic print engines and xerographic printing environments includes structures and functions that are well known in the printing field.

Significantly, in the embodiment shown, the scanner 404 is also connected to a color pixel counting module 416 which outputs information to a cost determination module 418. The color pixel counting module counts the pixels of the image that require or have assigned colorant amounts associated with rendering. The cost determination 418 also accepts, as inputs, data representing the threshold information and cost per pixel information and determines whether the cost for printing the page being analyzed exceeds the threshold. In the preferred embodiment, this determination is simply a calculation comprising multiplying the cost per pixel by the number of pixels counted. That result is then compared to the threshold. The result of this determination is then fed to the image processing unit 406.

It should be recognized that, although the module 416 is preferably a color pixel counting module that counts, in the image, the color elements (e.g. color pixels) that have a colorant amount assigned to it or required by it for printing an image, the module could take any suitable form to determine the colorant amounts that will be required by the image for rendering. The module 416 is thus not limited to a pixel counting module. Likewise, although the cost determination module 418 accepts a cost per pixel as an input and performs appropriate calculations using such data (as well as the pixel count), the module could alternatively accept any data on the colorant amounts of the image and any cost data, examples of which are described above, that conform to the specific embodiment being implemented. Of course, the calculations would vary depending on the nature of the cost data that is input.

Figure 5:
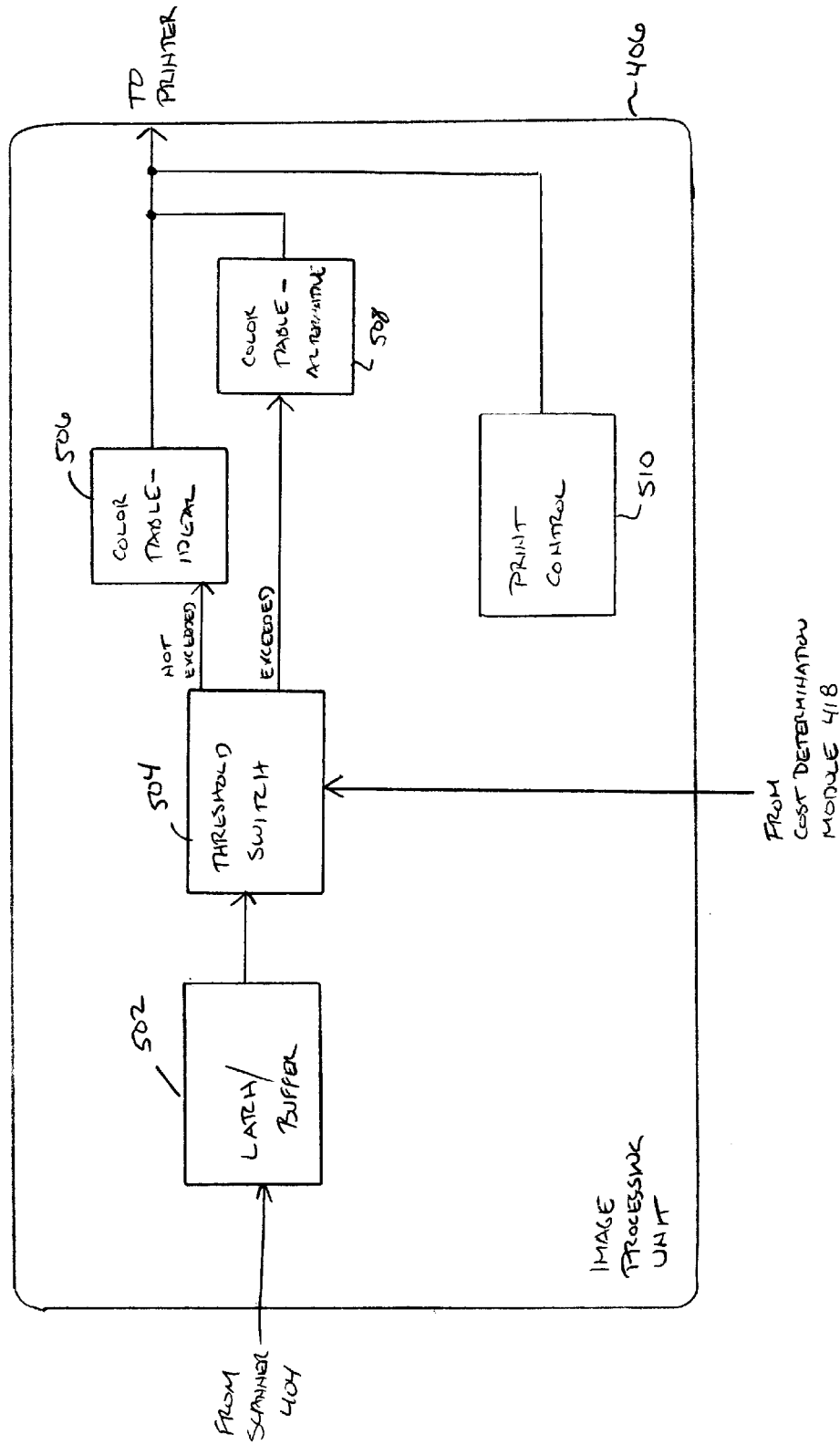
FIG. 5 is a block diagram of an image processing unit according to the present invention.

In this regard, with reference now to FIG. 5, the image processing unit 406 in a preferred form is illustrated. As shown, a latch or buffer 502, for retaining a predefined amount of data representing the image, connects to a threshold switch 504. The switch 504 receives input from the cost determination module 418 (FIG. 4) as to whether the threshold is exceeded. If not, the image data is used to access a typical or ideal color table, color table 506, in the system to print a full color image. If the threshold is exceeded, however, the switch facilitates transfer of the image data to access the alternative color table 508, which includes color values of reduced saturation in the preferred embodiment. However, as noted above, the alternative color table could shift the hue of colors from secondary to primary colors that require only one colorant (not two) to produce a rendering. In this case, the table includes values representing the shift. A reduced color image is then printed by the print engine. Those skilled in the art will appreciate that the image processing unit 406 also includes a print control module 510.

Figure 6:
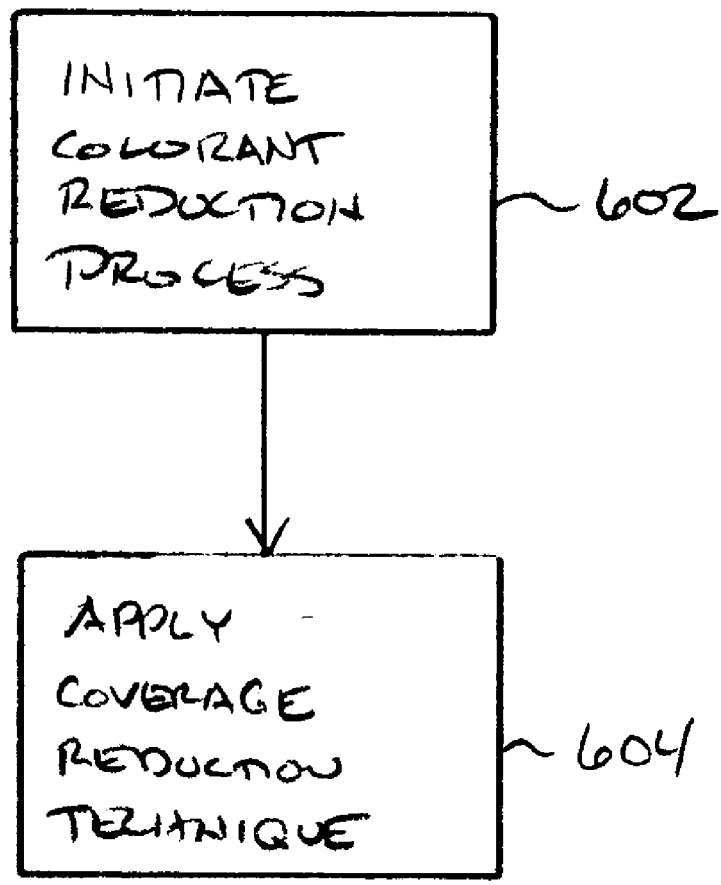
FIG. 6 is a flow chart illustrating an alternative method for reducing colorant amounts according to the present invention.

In another embodiment of the present invention, the colorant amount reduction step takes a different form. With reference now to FIG. 6, the colorant reducing step includes initiation of the process (step 602) and then implementation of at least one of a variety of coverage area reduction processes (step 604).

These processes are described in commonly assigned U.S. Pat. No. 5,635,967 to Klassen entitled "Image Processing Method To Reduce Marking Material Coverage And Printing Processes", U.S. Pat. No. 5,519,815 to Klassen entitled "Image Processing Method To Reduce Marking Material Coverage And Printing Processes", and U.S. Pat. No. 6,081,340 to Klassen entitled "Image Processing Method To Reduce Marking Material Coverage With Non-Linear Specifications", all of which are incorporated herein by reference. A still further color reducing method that could be implemented in connection with the present invention is described in U.S. application Ser. No. 09/232,641, entitled "Imaging Processing Method To Reduce Marking Material Coverage And Printing Processes", now U.S. Pat. No. 6,445,463 B1, which is also incorporated herein by reference.

It will be appreciated by those skilled in the art that the use of these methods is advantageous in situations where an image has already been color corrected and half-toned, if necessary, at the point where the adjustment to the amount of colorant is to be made. These coverage reduction techniques could then be used not only to reduce colorant across the entire image but also to localize colorant reduction to not desaturate the fine lines in small text, or to desaturate graphics or text having a true color border, or to simply shift secondary colors to primary hues.

In this regard, U.S. Pat. No. 5,635,967 relates to a method and apparatus for reducing marking material coverage in reproduction of edges in a half tone image. The method includes the steps of detecting edges in the image using edge filtering and reducing the marking material coverage at the detected edges.

U.S. Pat. No. 5,519,815 relates to a device for processing color images wherein a method of reducing marking material coverage in text and line art is implemented. The method includes the steps of determining the locations of text and line art color pixels having excessive marking material coverage, processing separation pixels to turn off a predetermined portion of the separation pixels corresponding to color pixels having excessive marking material coverage (upon determining the locations of the color pixels having excessive marking material coverage), and processing a given area of separation pixels in an order which tends to randomize the turn off effect to prevent artifacts from occurring in the pixel reduction step.

U.S. Pat. No. 6,081,340 relates to a printing system for printing images including a system to reduce marking material coverage. In this system, color fidelity is maintained. The system includes an image input where the image defines an amount of marking material to be deposited on a printed reproduction, a marking material coverage calculated for determining expected original marking material coverage for a given area of a received image, and a marking material reduction controller for using the expected marking material determination to control coverage and reduce production of the given area in accordance with a nonlinear coverage reduction function.

U.S. application Ser. No. 09/232,641 discloses a method for processing a color image for printing and reduces an amount of marking material used in the printed image. The method includes the steps of measuring a marking material coverage value over a given area within the image for each separation bit map, summing the marking material coverage of each separation bit map to determine measured marking material coverage, comparing desired marking material coverage with measured total marking material coverage to derive an on/off ratio where the on/off ratio represents a number of pixels to be turned off compared to the number of pixels at the separation, setting a number of pixels to off in a non-black color separation bit map, retaining an on/off state of all the pixels in the black color separation irrespective of the on/off ration, and outputting the separation bit maps to a print controller.

Figure 7:
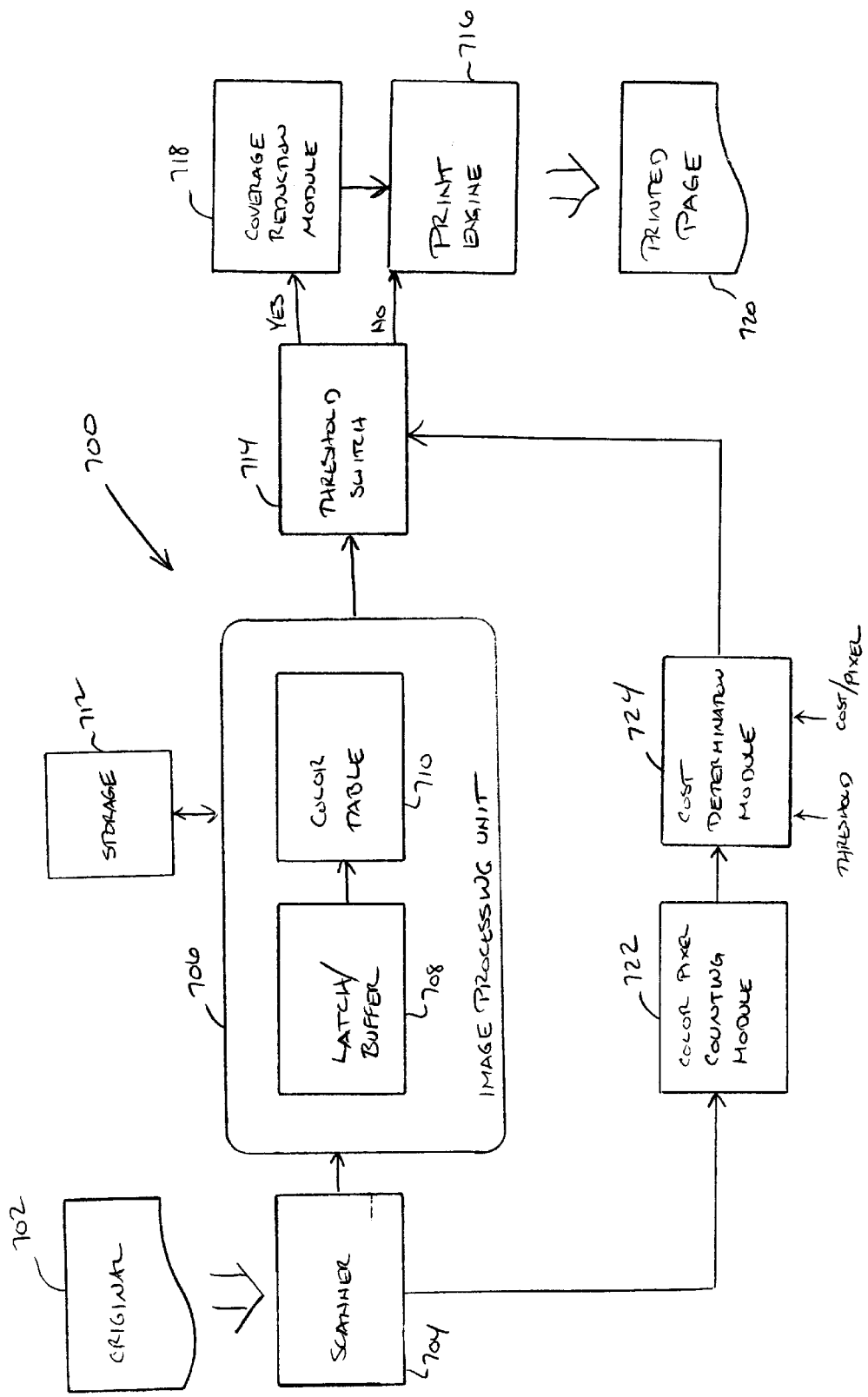
FIG. 7 is a block diagram illustrating an alternative embodiment of the present invention; and, FIG. 8 is a flow chart illustrating another alternative method for reducing colorant amounts according to the present invention.

Referring now to FIG. 7, a system 700 incorporating the colorant reduction techniques of FIG. 6 is shown. An original image 702 is received by a scanner 704 which provides rasterized image data to an image processing unit 706. The image processing unit 706 includes a latch or buffer 708 and an ideal color table 710. The image processing unit 706 also has access to and communicates with a storage device 712. The output of the image processing unit is connected to a threshold switch 714 having outputs connected to a print engine 716 and a coverage reduction module 718. In addition, the scanner 704 feeds data to a color pixel counting module 722 which, in turn, has an output connected to a cost determination module 724. The color pixel counting module counts the pixels of the image that require or have assigned colorant amounts associated with rendering. The output of cost determination module 724 is received by a threshold switch 714. In the preferred embodiment, this determination is simply a calculation comprising multiplying the cost per pixel by the number of pixels counted. That result is then compared to the threshold. As will be appreciated, if the threshold cost for a printed page 720 is not exceeded, a printed page 720 is simply printed in full color according to the colors specified in the color table 710. If, however, threshold cost for a printed page 720 is exceeded, the coverage reduction module implements coverage reduction techniques as described above and then prints the page based thereon.

Preferably, the print engine 716 is a xerographic print engine that operates in a xerographic printing environment. The printing environment is preferably a digital printing environment but may also be of other types. Moreover, xerographic print engines and xerographic printing environments includes structures and functions that are well known in the printing field.

It should be recognized that, although the module 722 is preferably a color pixel counting module that counts, in the image, the color elements (e.g. color pixels) that have a colorant amount assigned to it or required by it for printing an image, the module could take any suitable form to determine the colorant amounts that will be required by the image for rendering. The module 722 is thus not limited to a pixel counting module. Likewise, although the cost determination module 724 accepts a cost per pixel as an input and performs appropriate calculations using such data (as well as the pixel count), the module could alternatively accept any data on the colorant amounts of the image and any cost data, examples of which are described above, that conform to the specific embodiment being implemented. Of course, the calculations would vary depending on the nature of the cost data that is input.

Note that some coverage reduction methods allow continuously selectable reduction amounts. Note also that a plurality of color reduction tables could be employed in any of the described embodiments. If these techniques are used, then the threshold switch (504 or 714) is generalized, as those of skill in the art will appreciate, to provide the appropriate table selection or reduction value.

Figure 8:
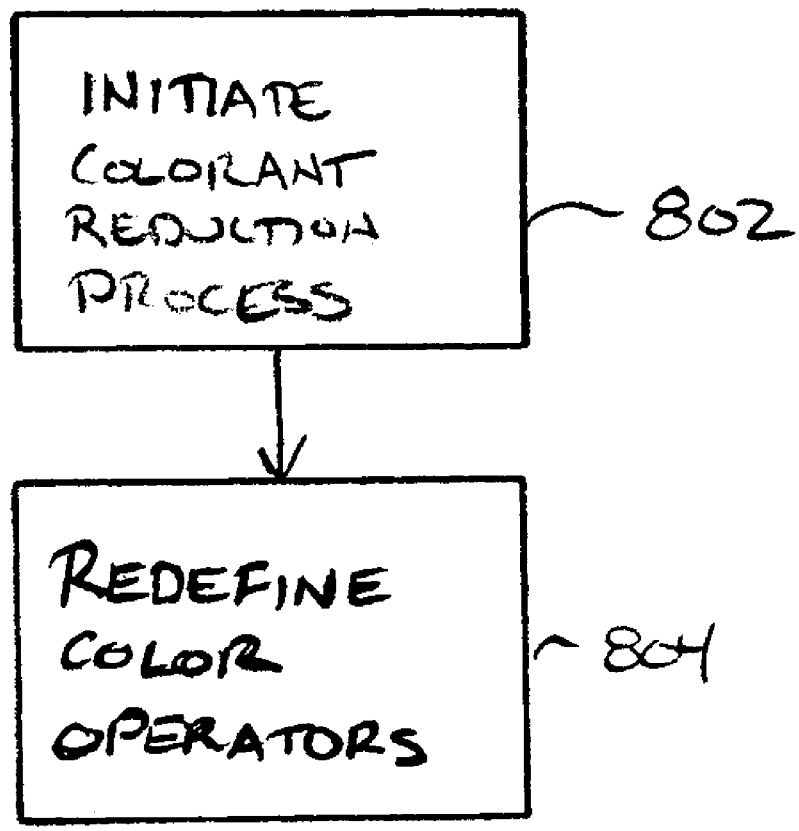

Still a further alternative for reducing colorant amounts is provided by the present invention. Referring now to FIG. 8, a method 800 for reducing colorant amounts is shown. This process is initiated (step 802) and then color operators are redefined (step 804). Images can be described as a sequence of imaging operation specifications that establish the color to use and describe the shape to be drawn as elements of the image. An imaging operator can be redefined such that when that operator is evoked with a color specification, it reduces that color specification prior to establishing it as the color used in drawing. It should be understood that this process has particular advantages if the analysis of the present invention is conducted in the print driver and the page is in a PostScript format since the PostScript language supports such a redefinition of operators.

It should be appreciated that while page coloring can be limited according to the present invention, it cannot be practically reduced to a cost that is less than the cost of a black and white page. It would, however, be possible to also reduce the cost of a completely neutral page by increasing the lightness (reducing the amount of black ink used).

It is to be still further appreciated that coloring cost analyses performed according to the present invention could also be collected and made available to a system administrator. A system administrator could then monitor the characteristics of the pages being printed.

Of course, the invention described in connection with the preferred embodiment of FIGS. 1–5 is particularly well-suited for color reduction of an entire page prior to rendering. However, it is to be understood that the invention may also be applied to circumstances where it is desirable to reduce colorant amounts differently on different parts of the image, or for different types of image elements. For example, photographs within a page may be color reduced (or converted to black-and-white) upon rendering. However, text and other graphics may retain color of original or reduced form. Such an embodiment of the invention would preferably consider color specifications at the object level rather than pixel level. Alternatively, the teachings of the above referenced patents and application on the known coverage reduction techniques could be employed to implement such a variation of the invention. For example, the determination of edges and lines would be useful in this regard.

It is to be understood that the present invention may be implemented using suitable hardware and software techniques. Such implementation should be apparent to those of skill in the field upon a reading of this disclosure. In addition, alternative hardware and software techniques may be used in appropriate circumstances to implement the invention.

As alluded to above, the invention finds particular application in a xerographic printing, or copying, environment using a xerographic print engine for rendering purposes. However, the invention may be applied in any image rendering system.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

Having thus described the invention, I hereby claim:

1. A method for controlling cost in an image rendering device wherein images rendered are represented in the device by color elements having color element specifications, the color elements each have associated therewith cost factors for printing dependent on particular associated colorants and amounts thereof and a threshold printing cost is set, the method comprising steps of:

providing a color image having color element specifications;

determining a colorant amounts of the color image;

calculating an actual printing cost for the image based on the colorant amounts and the colorant dependant cost factors;

determining whether the actual printing cost exceeds the threshold printing cost;

reducing colorant amounts to be used in printing if the actual printing cost exceeds the threshold printing cost; and, printing one of a modified color image based on the reducing and the color image.

2. The method as set forth in claim 1 wherein the color element specifications are pixel colors.

3. The method as set forth in claim 1 wherein the providing comprises scanning the color image.

4. The method as set forth in claim 1 wherein the calculating comprises multiplying the colorant amounts by the colorant-dependent cost factors and totaling over all of the color element specifications.

5. The method as set forth in claim 1 wherein the reducing of the colorant amounts comprises selecting an alternative color table.

6. The method as set forth in claim 1 wherein the reducing of the colorant amounts comprises applying coverage reduction techniques.

7. The method as set forth in claim 1 wherein the reducing of the colorant amounts comprises redefining color operators.

8. The method as set forth in claim 1 wherein the method is implemented in a xerographic printing environment.

9. An image rendering device wherein images rendered are represented in the device by color element specifications, the color element specifications each have associated therewith colorant-dependent cost factors for printing and a threshold printing cost is set, the system comprising:

an input operative to receive a color image having color element specifications;

a counting module operative to determine colorant amounts of the color image;

a cost determination module operative to calculate an actual printing cost for the image based on the colorant amounts and the colorant-dependent cost factors;

a threshold switch operative to determine whether and to what extent the actual printing cost exceeds the threshold printing cost;

an ideal color table containing ideal color information accessed through the threshold switch when the actual printing cost does not exceed the threshold;

an at least one alternative color table containing modified color information accessed through the threshold switch when the actual printing cost exceeds the threshold printing cost; and, a print engine operative to print one of a modified color image based on the modified color information of the alternative color table and the color image based on the ideal color information of the ideal color table.

10. The system as set forth in claim 9 further comprising a scanner.

11. The system as set forth in claim 9 wherein the threshold switch, ideal color table and the at least one alternative color table are included in an image processing unit.

12. The system as set forth in claim 9 wherein the modified color information of the alternative color table includes ideal colors having hue's shifted from secondary to primary colors.

13. The system as set forth in claim 9 wherein the modified color information of the alternative color table includes ideal colors having reduced saturation levels.

14. The system as set forth in claim 9 wherein the print engine comprises a xerographic print engine.

15. An image rendering device wherein images rendered are represented in the device by pixels, the pixels each have associated therewith a pixel cost for printing and a threshold printing cost is set, the system comprising steps of:

means for providing a color image having color pixels;

means for determining a number of the color pixels of the color image;

means for calculating an actual printing cost for the image based on the number of color pixels and the pixel cost;

means for determining whether the actual printing cost exceeds the threshold printing cost;

means for reducing colorant amounts to be used in printing if the actual printing cost exceeds the threshold printing cost; and, means for printing one of a modified color image based on the reducing and the color image.

16. The system as set forth in claim 15 wherein the providing means comprises a scanner.

17. The system as set forth in claim 15 wherein the calculating means comprises a means for multiplying the number of color pixels by the pixel cost.

18. The system as set forth in claim 15 wherein the means for reducing the colorant amounts comprises an alternative color table.

19. The system as set forth in claim 15 wherein the means for reducing the colorant amounts comprises means for applying coverage reduction techniques.

20. The system as set forth in claim 15 wherein the means for reducing the colorant amounts comprises means for redefining color operators.

* * * * *